United States Patent
Yang et al.

(10) Patent No.: US 11,304,203 B2
(45) Date of Patent: Apr. 12, 2022

(54) METHOD AND SYSTEM FOR RAN INTELLIGENT CONTROLLER

(71) Applicant: Verizon Patent and Licensing Inc., Washington, DC (US)

(72) Inventors: Jin Yang, Orinda, CA (US); Krishna K. Bellamkonda, Roanoke, TX (US); Xin Wang, Morris Plains, NJ (US)

(73) Assignee: Verizon Patent and Licensing Inc., Basking Rdge, NJ (US)

( * ) Notice: Subject to any disclaimer, the term of this patent is extended or adjusted under 35 U.S.C. 154(b) by 257 days.

(21) Appl. No.: 16/790,794

(22) Filed: Feb. 14, 2020

(65) Prior Publication Data
US 2021/0258969 A1   Aug. 19, 2021

(51) Int. Cl.
| | |
|---|---|
| *H04W 4/00* | (2018.01) |
| *H04W 72/08* | (2009.01) |
| *G06N 5/04* | (2006.01) |
| *G06N 20/00* | (2019.01) |

(52) U.S. Cl.
CPC .............. *H04W 72/08* (2013.01); *G06N 5/04* (2013.01); *G06N 20/00* (2019.01)

(58) Field of Classification Search
CPC ......... G06N 5/04; G06N 20/00; H04W 24/02; H04W 28/24; H04W 72/08; H04W 74/0833; H04W 84/042; H04W 84/18
See application file for complete search history.

(56) References Cited

U.S. PATENT DOCUMENTS

| | | | |
|---|---|---|---|
| 10,560,759 B1* | 2/2020 | Liu ..................... | H04N 21/6587 |
| 10,673,546 B2* | 6/2020 | Bedekar ................ | G06N 20/00 |
| 10,856,217 B1* | 12/2020 | Young ................... | H04W 88/18 |
| 2021/0204148 A1* | 7/2021 | Chou .................... | H04W 24/02 |
| 2021/0306899 A1* | 9/2021 | Mishra .............. | H04W 28/0268 |

OTHER PUBLICATIONS

Robb, O-RAN How Open Source Software and Standards Will Transform Radio Access, The Linux Foundation, 13 pages, May 6, 2019.*
O-RAN Alliance, O-RAN: Towards an Open and Smart RAN, White Paper, 19 pages, Oct. 2018.*
Ferrus et al., Applicability Domains of Machine Learning in Next Generation Radio Access Networks, IEEE, 8 pages, 2019.*
National Instruments, An Introduction to O-RAN, White Paper, 8 pages, 2020.*
Open Networking Foundation, ONF's Software-Defined RAN Platform Consistent with the O-RAN Architecture, 13 pages, Feb. 2020.*
Niknam et al., Intelligent O-RAN for Beyond 5G and 6G Wireless Networks, arXiv, 7 pages, May 17, 2020.*
Diego, Evolution Toward the Next Generation Radio Access Network, IEEE, 1 page, Jul. 17, 2020.*
Singh et al., The Evolution of Radio Access Network Towards Open-RAN: Challenges and Opportunities, IEEE, 6 pages, 2020.*
Lee et al., Hosting AI/ML Workflows on O-RAN RIC Platform, IEEE, 6 pages, 2020.*

* cited by examiner

*Primary Examiner* — Frank Duong

(57) ABSTRACT

A method, a device, and a non-transitory storage medium are described in which a radio service is provided. A radio access network intelligent controller (RIC) system may provide the RIC service. The RIC system may include a non-real-time RIC, a near real-time RIC, a real-time RIC and machine learning or artificial intelligent devices that include radio network information of the corresponding time scale. The RIC system may provide RIC control for bounded performance metrics, such as latency and reliability.

20 Claims, 8 Drawing Sheets

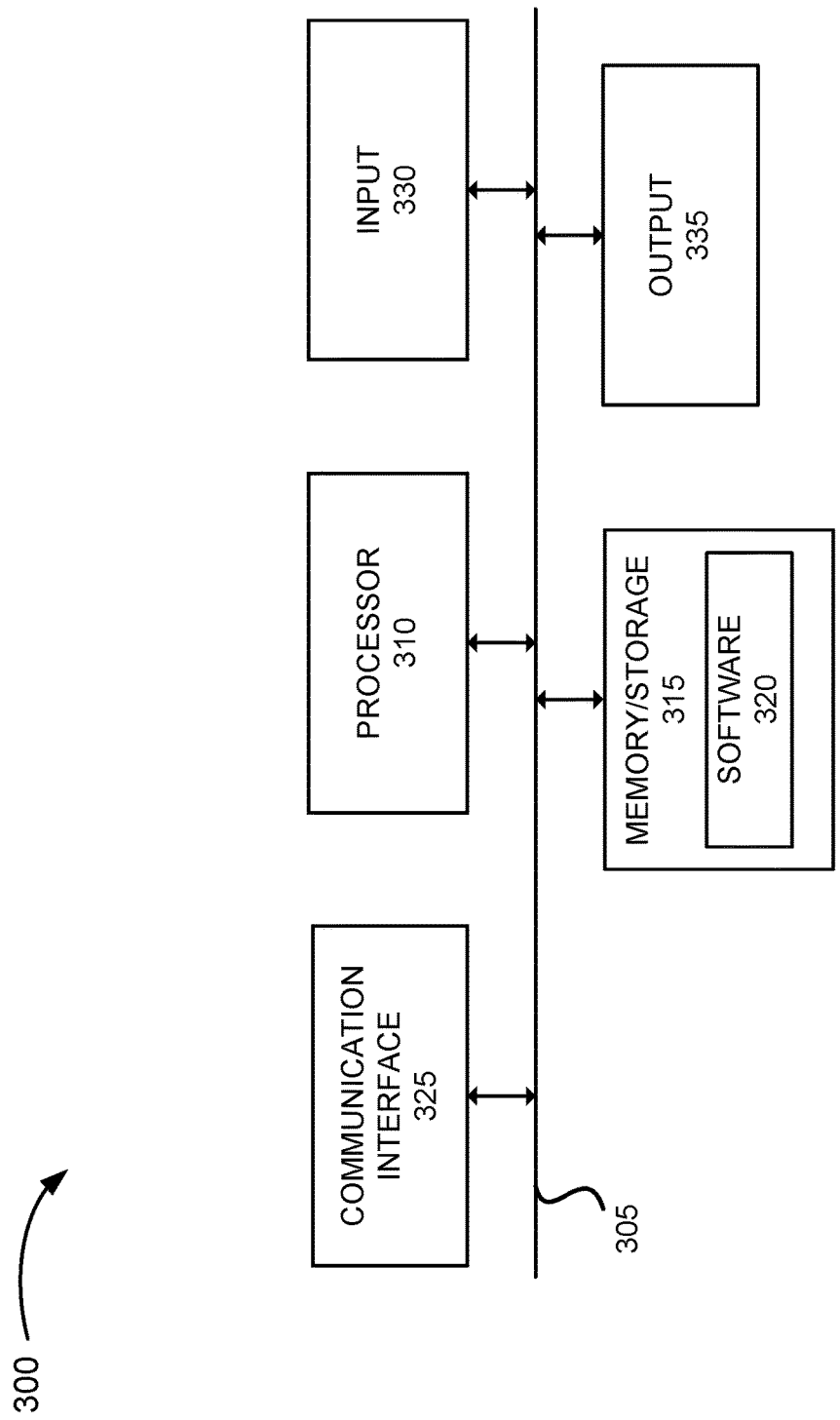

METHOD AND SYSTEM FOR RAN INTELLIGENT CONTROLLER

BACKGROUND

Development and design of networks present certain challenges from a network-side perspective and an end device perspective. For example, Centralized Radio Access Network (C-RAN) and Open Radio Access Network (O-RAN) architectures have been proposed to satisfy the increasing complexity, densification, and demands of end device application services of a future generation network.

BRIEF DESCRIPTION OF THE DRAWINGS

FIG. 3 is a diagram illustrating exemplary components of a device that may correspond to one or more of the devices illustrated and described herein;

DETAILED DESCRIPTION OF PREFERRED EMBODIMENTS

Figure 1:
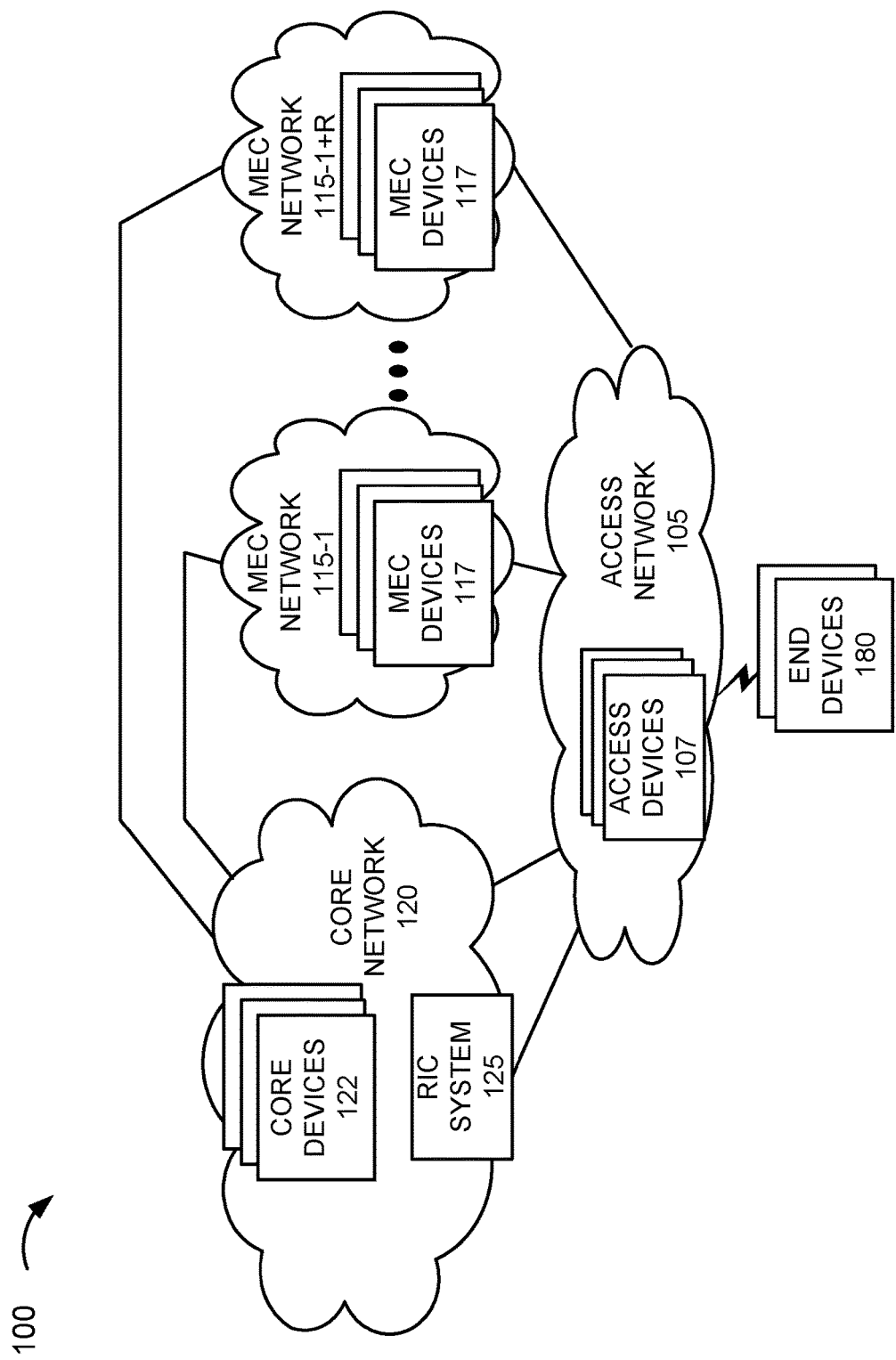
FIG. 1 is a diagram illustrating an exemplary environment in which an exemplary embodiment of a RAN Intelligent Controller (RIC) service may be implemented.

The following detailed description refers to the accompanying drawings. The same reference numbers in different drawings may identify the same or similar elements. Also, the following detailed description does not limit the invention.

The development and design of next generation wireless networks may be based on cloud technologies, software defined networking (SDN), and network function virtualization (NFV). Ubiquitous automation, network slicing, machine learning, artificial intelligence, closed loop service assurance, self-healing, and other network attributes and/or services may be integral aspects of next generation networks. For example, network slicing services of the next generation network may create and dynamically manage functionally isolated networks (e.g., virtualized, logical, physical, etc.). A next generation network may include a RAN, a core network, a service or application layer network, a cloud network, and so forth.

The O-RAN Reference Architecture includes a non-real time RAN Intelligent Controller (RIC), a near-real-time RIC, various open interfaces (e.g., O1, A1, E2, open fronthaul interface, etc.), interoperability with standard interfaces (e.g., Third Generation Partnership Project (3GPP) interfaces, such as F1, W1, E1, X2, Xn, etc.), open network devices (e.g., O-RAN Centralized Unit (O-CU), O-RAN Distributed Unit (O-DU), O-RAN next generation Node B (O-gNB), O-RAN evolved Node B (O-eNB, etc.), white box hardware, and open source software. The hierarchical RICs may include machine learning (ML) models and/or artificial intelligence (AI) components. The O-RAN Reference Architecture may extend the SDN based on the decoupling of the control plane and the user plane, provide for RAN cloudification, and support various layer splits (e.g., Packet Data Convergence Protocol (PDCP), Radio Link Control (RLC), Physical (PHY), etc.).

The control functionality of the non-real-time RIC relates to greater than about 1 second (>1 s) timeframe and the control functionality of the near real-time RIC relates to less than about 1 second (<1 s) timeframe. Messages generated from AI-enabled policies and ML-based models of the non-real-time RIC may be communicated to the near-real-time RIC. However, under this framework, the non-real-time RIC includes the intelligence for both the non-real-time RIC and the near real-time RIC. The non-real-time RIC may control relative long term settings, such as network slicing configuration and selection.

According to exemplary embodiments, a RIC service is described. According to an exemplary embodiment, a RIC system provides the RIC service. According to an exemplary embodiment, the RIC system includes a non-real-time RIC, a near real-time RIC, and a real-time RIC. According to an exemplary embodiment, the non-real-time RIC, the near real-time RIC, and the real-time RIC may each include AI/ML models. According to an exemplary embodiment, the non-real-time RIC, the near real-time RIC, and the real-time RIC may each be attributed to a different time scale. According to an exemplary embodiment, the AI/ML models for each RIC may relate to a time scale and a performance metric.

According to an exemplary embodiment, the RIC service may provide a bounded latency with reliability as the performance metric, as described herein. According to an exemplary embodiment, the RIC service may provide for the selection of a network slice based on latency relating to a multi-access edge computing (MEC) network and associated application service, the selection of radio and transport routing based on the mobility of an end device, and control of reliability based on radio resource management. The RIC service may adjust the network slice, downgrade the requirements of latency and/or reliability relating to the application service, or indicate that the application service cannot be supported. According to other exemplary embodiments, the RIC service may provide for a different set of performance metrics.

In view of the foregoing, the RIC service may optimize the allocation and use of RAN resources to achieve a desired performance metric, such as latency and reliability, as well as improve network capacity, user throughput, connectivity, and other performance metrics.

FIG. 1 is a diagram illustrating an exemplary environment 100 in which an exemplary embodiment of the RIC service may be implemented. As illustrated, environment 100 includes access network 105, MEC network 115-1 through 115-1+R (also referred to collectively as MEC networks 115, and individually or generally as MEC network 115), and a core network 120. Access network 105 includes access devices 107. MEC network 115 includes MEC devices 117. Core network 120 includes core devices 122 and a RIC system 125. Environment 100 further includes end devices 180.

The number, type, and arrangement of networks illustrated in environment 100 are exemplary. For example, according to other exemplary embodiments, environment 100 may include an additional and/or different application service layer network. Additionally, or alternatively, other networks not illustrated in FIG. 1 may be included, such as a backhaul/fronthaul network or another type of network (e.g., an external network, etc.), as described herein.

The number, the type, and the arrangement of network devices, and the number of end devices 180 are exemplary. A network device, a network element, or a network function (also referred to as a network device) may be implemented according to one or multiple network architectures, such as a client device, a server device, a peer device, a proxy device, a cloud device, and/or a virtualized network device. Additionally, a network device may be implemented according to various computing architectures, such as centralized, distributed, cloud (e.g., elastic, public, private, etc.), edge, fog, and/or another type of computing architecture, and may be incorporated into various types of network architectures (e.g., SDN, virtual, logical, network slice, etc.).

Environment 100 includes communication links between the networks, between the network devices, and between end devices 180 and the network/network devices. Environment 100 may be implemented to include wired, optical, and/or wireless communication links. A communicative connection via a communication link may be direct or indirect. For example, an indirect communicative connection may involve an intermediary device and/or an intermediary network not illustrated in FIG. 1. A direct communicative connection may not involve an intermediary device and/or an intermediary network. The number and the arrangement of communication links illustrated in environment 100 are exemplary.

Environment 100 may include various planes of communication including, for example, a control plane, a user plane, a service plane, and a network management plane. Environment 100 may include other types of planes of communication. A message communicated in support of the RIC service may use at least one of these planes of communication. Additionally, an interface of a network device may be modified (e.g., relative to an interface defined by a standard, such as 3GPP, International Telecommunication Union (ITU), European Telecommunications Standards Institute (ETSI), GSM Association (GSMA), O-RAN, etc.) or a new interface of the network device may be provided in order to support the communication (e.g., transmission and reception of messages, information elements (IE), attribute value pairs (AVPs), etc.) between network devices that support the RIC service, as described herein. According to various exemplary implementations, the interface of a network device may be a service-based interface, a reference point-based interface, or an O-RAN interface.

Access network 105 may include one or multiple networks of one or multiple types and technologies. For example, access network 105 may be implemented to include a Fourth Generation (4G) RAN (e.g., an Evolved UMTS Terrestrial Radio Access Network (E-UTRAN) of a Long Term Evolution (LTE) network), a 4.5G RAN (e.g., an E-UTRAN of an LTE-Advanced (LTE-A) network), an RAN of an LTE-A Pro network, a next generation RAN (e.g., a Fifth Generation (5G)-access network (5G-AN) or a 5G-RAN (referred to herein as simply a 5G-RAN)), another type of future generation RAN, and/or another type of RAN (e.g., a legacy Third Generation (3G) RAN, etc.). Access network 105 may communicate with other types of access networks, such as, for example, a WiFi network, a Worldwide Interoperability for Microwave Access (WiMAX) network, a local area network (LAN), a Citizens Broadband Radio System (CBRS) network, a cloud RAN, a wired network (e.g., optical, cable, etc.), an optical network, or another type of network that provides access to or can be used as an on-ramp to access network 105, MEC network 115, and/or core network 120.

Access network 105 may include different and multiple functional splitting, such as options 1, 2, 3, 4, 5, 6, 7, or 8 that relate to combinations of access network 105 and core network 120 including an Evolved Packet Core (EPC) network and/or a NG core (NGC) network, or the splitting of the various layers (e.g., physical layer, Media Access Control (MAC) layer, RLC layer, and PDCP layer), plane splitting (e.g., user plane, control plane, etc.), centralized unit (CU) and distributed unit (DU), interface splitting (e.g., F1-U, F1-C, E1, Xn-C, Xn-U, X2-C, Common Public Radio Interface (CPRI), etc.) as well as other types of network services, such as dual connectivity (DC) or higher (e.g., a secondary cell group (SCG) split bearer service, a master cell group (MCG) split bearer, an SCG bearer service, non-standalone (NSA), standalone (SA), etc.), CA (e.g., intra-band, inter-band, contiguous, non-contiguous, etc.), network slicing, coordinated multipoint (CoMP), various duplex schemes (e.g., frequency division duplex (FDD), time division duplex (TDD), half-duplex FDD (H-FDD), etc.), and/or another type of connectivity service.

According to some exemplary embodiments, access network 105 may be implemented to include various architectures of wireless service, such as, for example, macrocell, microcell, femtocell, picocell, metrocell, new radio (NR) cell, LTE cell, non-cell, or another type of cell architecture. Additionally, according to various exemplary embodiments, access network 105 may be implemented according to various wireless technologies (e.g., radio access technologies (RATs), etc.), and various wireless standards, frequencies, bands, and segments of radio spectrum (e.g., centimeter (cm) wave, millimeter (mm) wave, below 6 Gigahertz (GHz), above 6 GHz, licensed radio spectrum, unlicensed radio spectrum, etc.), and/or other attributes or technologies used for radio communication.

Depending on the implementation, access network 105 may include one or multiple types of network devices, such as access devices 107. For example, access devices 107 may include an evolved Node B (eNB), a next generation Node B (gNB), an evolved Long Term Evolution (eLTE) eNB, a radio network controller (RNC), a remote radio head (RRH), a baseband unit (BBU), a CU, a DU, a small cell node (e.g., a picocell device, a femtocell device, a microcell device, a home eNB, etc.), a future generation wireless access device, another type of wireless node (e.g., a WiFi device, a WiMax device, a hotspot device, etc.) that provides a wireless access service, or other another type of network device that provides a transport service (e.g., routing and forwarding), such as a router, a switch, or another type of layer 3 (e.g., network layer of the Open Systems Interconnection (OSI) model) network device. Additionally, or alternatively, access devices 107 may include wired and/or optical devices (e.g., modem, wired access point, optical access point, Ethernet device, etc.) that provide network access. According to some exemplary embodiments, access devices 107 may include O-RAN access devices 107 and O-RAN interfaces that provide a RIC service, as described herein.

MEC network 115 includes a platform that provides an application service. As illustrated, MEC network 115 may be located at an edge of a network, such as access network 105. Although not illustrated, MEC network may be co-located with another type of network, such as core network 120 or an external network. Alternatively, MEC network 115 may not be co-located. MEC network 115 may be implemented using one or multiple technologies including, for example, network function virtualization (NFV), containers, SDN, cloud computing, Infrastructure-as-a-Service (IaaS), Platform-as-a-Service (PaaS), Software-as-a-Service (SaaS), or another type of network technology.

Depending on the implementation, MEC network 115 may include various types of network devices that are illustrated in FIG. 1 as MEC devices 117. For example, MEC devices 117 may include virtual network devices (e.g., virtualized network functions (VNFs), servers, hosts, containers, hypervisors, virtual machines, network function virtualization infrastructure (NFVI), and/or other types of virtualization elements, layers, hardware resources, operating systems, engines, etc.) and associated applications services for use by end devices 180. The application services may pertain to broadband services in dense areas (e.g., pervasive video, smart office, operator cloud services, video/photo sharing, etc.), broadband access everywhere (e.g., 50/100 Mbps, ultra low-cost network, etc.), higher user mobility (e.g., high speed train, remote computing, moving hot spots, etc.), Internet of Things (IoTs) (e.g., smart wearables, sensors, mobile video surveillance, smart cities, connected home, etc.), extreme real-time communications (e.g., tactile Internet, augmented reality (AR), virtual reality (VR), etc.), lifeline communications (e.g., natural disaster, emergency response, etc.), ultra-reliable communications (e.g., automated traffic control and driving, collaborative robots, health-related services (e.g., monitoring, remote surgery, etc.), drone delivery, public safety, etc.), broadcast-like services, and/or other types of mobile edge application services.

Additionally, depending on the implementation, MEC devices 117 may include other types of network devices, such as an orchestrator (e.g., a network function virtualization orchestrator (NFVO), a mobile edge (ME) orchestrator, etc.), a virtualized infrastructure manager (VIM), a virtual network function manager (VNFM), an ME platform manager, an operations support system (OSS), a local domain name system (DNS), registries, a traffic rules controller, an ME platform, and/or other types of network devices (e.g., routers, core devices 122, an ingress device, a load balancer, etc.), and network resources (e.g., storage devices, communication links, etc.).

Core network 120 may include one or multiple networks of one or multiple network types and technologies. Core network 120 may include a complementary network of access network 105. For example, core network 120 may be implemented to include an Evolved Packet Core (EPC) of an LTE, an LTE-A, an LTE-A Pro, a next generation core (NGC) network, and/or a future generation core network. Core network 120 may include a legacy core network.

Depending on the implementation of core network 120, core network 120 may include various types of network devices that are illustrated in FIG. 1 as core devices 122. For example, core devices 122 may include a mobility management entity (MME), a packet gateway (PGW), a serving gateway (SGW), a home subscriber server (HSS), an authentication, authorization, and accounting (AAA) server, a policy charging and rules function (PCRF), a charging system (CS), a user plane function (UPF), an AMF, an SMF, a unified data management (UDM) device, an authentication server function (AUSF), a network slice selection function (NSSF), a network repository function (NRF), a network exposure function (NEF), a PCF, a network data analytics function (NWDAF), a lifecycle management (LCM) device, and/or an application function (AF). According to other exemplary implementations, core network 120 may include additional, different, and/or fewer network devices than those described. For example, core devices 122 may include a non-standard and/or a proprietary network device, or another type of network device that may be well-known but not particularly mentioned herein.

RIC system 125 provides a RIC service, as described herein. RIC system 125 may include interfaces that provide communication with access devices 107 of access network 105, as described herein. RIC system 125 is described further herein.

End device 180 includes a device that has computational and communication capabilities (e.g., wireless, wired, optical, etc.). End device 180 may be implemented as a mobile device, a portable device, a stationary device (e.g., a non-mobile device), a device operated by a user, or a device not operated by a user. For example, end device 180 may be implemented as a Mobile Broadband device, a smartphone, a computer, a tablet, a netbook, a phablet, a wearable device (e.g., a watch, glasses, a visor, etc.), a vehicle support system, an Internet of Things (IoT) device, a user device, an autonomous device, a smart device, a drone, customer premise equipment (e.g., a set top box, etc.), a streaming player device, a global positioning device, a game system, a music playing system, or some other type of wireless, wired, and/or optical end device. According to various exemplary embodiments, end device 180 may be configured to execute various types of software (e.g., applications, programs, etc.). The number and the types of software may vary among end devices 180.

End device 180 may support one or multiple RATs (e.g., 4G, 5G, etc.) and various portions of the radio spectrum (e.g., multiple frequency bands, multiple carrier frequencies, licensed, unlicensed, etc.), network slicing, DC service, and/or other types of connectivity services. Additionally, end device 180 may include one or multiple communication interfaces that provide one or multiple (e.g., simultaneous) connections via the same or different RATs, frequency bands, carriers, network slices, and/or other communication medium (e.g., wired, etc.). The multimode capabilities of end device 180 may vary among end devices 180.

Figure 2A:
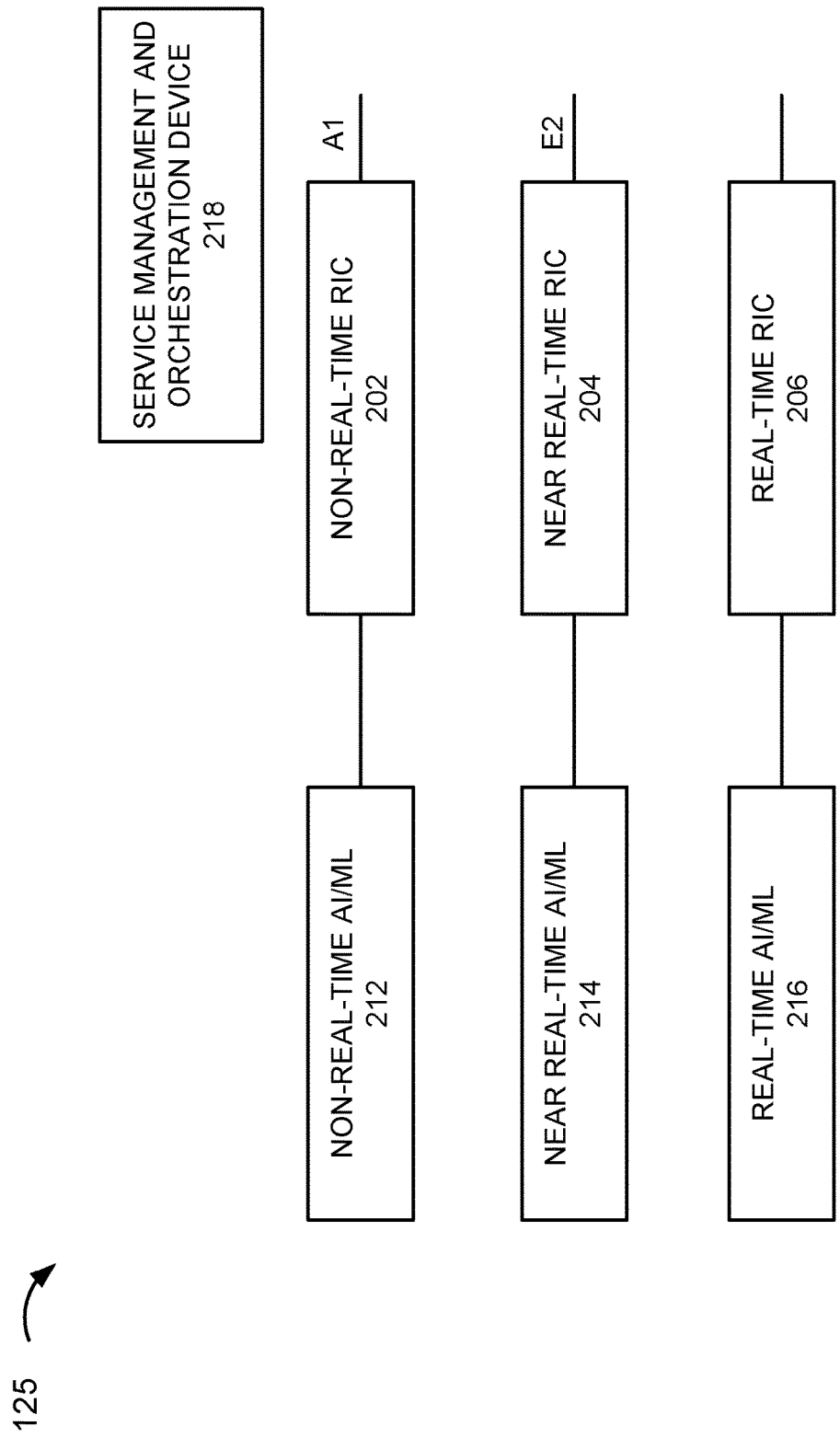
FIG. 2A is a diagram illustrating an exemplary embodiment of a RIC system depicted in FIG. 1 may be implemented.

FIG. 2A is a diagram illustrating exemplary devices of RIC system 125. As illustrated, RIC system 125 may include a non-real-time RIC 202, a near real-time RIC 204, and a real-time RIC 206. RIC system 125 may further include a non-real-time AI and/or ML (AI/ML) 212, a near real-time AI/ML 214, a real-time AI/ML 216, and a service management and orchestration device 218. The number, type, and arrangement of devices illustrated are exemplary. Multiple devices may be combined into a single device. Additionally, or alternatively, a single device may be implemented as multiple devices in which a process or a function may be collaboratively performed or multiple processes or functions may be split between them. According to various embodiments, a device may operate on various planes of an environment. For example, the various planes may include a data plane, a control plane, a management plane, and/or other planes implemented within the environment. Additionally, the number, type, and arrangement of communication links illustrated are also exemplary.

Non-real-time RIC 202 may support non-real-time intelligent radio resource management, higher layer procedure optimization, and policy optimization in a RAN. According to an exemplary embodiment, non-real-time RIC 202 may optimize radio resource management according to a performance metric requirement for an application service provided by MEC network 115 or other types of application service layer networks, such as the Internet, the World Wide Web (WWW), an Internet Protocol Multimedia Subsystem (IMS) network, a Rich Communication Service (RCS) network, a cloud network, a packet-switched network, a private network, a public network, or another type of network that hosts and provides an end device application service via access network 105. According to an exemplary embodiment, the performance metric requirement pertains to latency.

Non-real-time RIC 202 may control and optimize various radio resources, such as network slicing associated with a 5G or future RAN, or radio bearers associated with a 4G RAN. For example, non-real-time RIC 202 may select the network slice based on a network path for end device 180 to MEC network 115 and the associated latency requirement and application service. Non-real-time RIC 202 may optimize and manage the radio resource according to a non-real-time time scale. For example, non-real-time RIC 202 may operate according to a time scale of greater than about 1 second or another configurable time scale. As described herein, non-real-time RIC 202 may manage the radio resources in view of latency (or another configured performance metric (e.g., a guaranteed bit rate/throughput, sustained bit rte/throughput, etc.)) in cooperation with non-real-time AI/ML 212.

Near real-time RIC 204 may support near real-time intelligent radio resource management, QoS management, connectivity management, and handover management in a RAN. According to an exemplary embodiment, near real-time RIC 204 may optimize radio resource management according to a performance metric requirement for an application service provided by MEC network 115 or other types of application service layer networks. According to an exemplary embodiment, the performance metric requirement pertains to latency.

Near real-time RIC 204 may control and optimize various radio resources, such as the selection of access devices 107 (e.g., eNB, CU, gNB, etc.) associated with a 4G, 5G, or future RAN. For example, near real-time RIC 204 may control radio and transport routing for end device 180 to MEC network 115 and the associated latency requirement and application service. Near real-time RIC 204 may analyze data relating to a type of end device 180 (e.g., stationary, mobile, etc.) and mobility of end device 180 (e.g., speed, direction, etc.). Near real-time RIC 204 may optimize and manage the radio resource according to a near real-time time scale. For example, near real-time RIC 204 may operate according to a time scale of less than about 1 second or another configurable time scale. As described herein, near real-time RIC 204 may manage the radio resources in view of latency (or another configured performance metric) in cooperation with near real-time AI/ML 214. AI/ML 214 may be configured or based on goal functions defined by operators. The goal functions and corresponding control parameters may be different for different types of services.

Real-time RIC 206 may support real-time intelligent radio resource management. According to an exemplary embodiment, real-time RIC 206 may optimize radio resource management according to a performance metric requirement for an application service provided by MEC network 115 or other types of application service layer networks. According to an exemplary embodiment, the performance metric requirement pertains to latency and reliability.

Real-time RIC 206 may control and optimize various radio resources of access devices 107 (e.g., eNB, radio unit (RU), gNB, etc.) associated with a 4G, 5G, or future RAN. For example, real-time RIC 206 may control radio resource scheduling for uplink and downlink communication with end device 180 and the associated latency and reliability requirements and application service. Real-time RIC 206 may also control other aspects of radio transmission and reception of user plane traffic and control signaling, as described herein. Near real-time RIC 204 may optimize and manage the radio resource according to a real-time time scale. For example, real-time RIC 206 may operate according to a time scale of less than about 1 second or another configurable time scale. As described herein, real-time RIC 206 may manage the radio resources in view of latency and reliability (or another configured performance metric) in cooperation with near real-time AI/ML 216. The goal functions for AI/ML 216 and corresponding control parameters may be the same or different from AI/ML 212 and/or AI/ML 214.

Non-real-time AI/ML 212 may provide intelligence for control of radio resources according to a non-real-time time scale. The non-real-time time scale may be a configurable time period. For example, non-real-time AI/ML 212 may provide a prediction for satisfying a performance metric, such as latency relative to a network slice, a radio bearer, and/or one or more planes of communication according to the non-real-time time period. Non-real-time AI/ML 212 may provide for data collection from access devices 107, analysis, and AI and/or ML to enable intelligent control of radio resources by non-real-time RIC 202.

Near-real-time AI/ML 214 may provide intelligence for control of radio resources according to a near real-time time scale. The near-real-time time scale may be a configurable time period. For example, near-real-time AWL 214 may provide a prediction for satisfying a performance metric, such as latency and reliability relative to a network slice, a radio bearer, and/or one or more planes of communication according to the near-real-time time period. Near real-time AI/ML 214 may provide for data collection from access devices 107, analysis, and AI and/or ML to enable intelligent control of radio resources by near-real-time RIC 204.

Real-time AI/ML 216 may provide intelligence for control of radio resources according to a real-time time scale. The real-time time scale may be a configurable time period. For example, real-time AWL 216 may provide a prediction for satisfying a performance metric, such as latency and reliability relative to a network slice, a radio bearer, and/or one or more planes of communication, according to the real-time time period. Real-time AI/ML 216 may provide for data collection from access devices 107, analysis, and AI and/or ML to enable intelligent control of radio resources by real-time RIC 206.

Non-real-time RIC 202, near real-time 204, and real-time RIC 206 may control different aspects of radio resources, different access devices 107, planes of communication, and layers of a protocol stack. For example, according to an exemplary embodiment of the RIC service, non-real-time RIC 202 may include the selection of the radio portion of a network slice or a 4G radio bearer in view of the application service pertaining to end device 180 and other criteria, such as Key Performance Indicators (KPIs), 5G QoS Identifier (5GQI), Quality of Service Class Identifier (QCI), and so forth. Additionally, for example, near real-time RIC 204 may include control for radio and transport routing for end device 180, and real-time RIC 206 may include control of radio resource scheduling and radio transmission and reception, as described herein.

According to various exemplary embodiments, the intelligence control of the RIC service towards the radio resources may relate to link adaptation based on different Block Error Rate (BLER) targets, different modulation coding schemes, different waveforms (e.g., cyclic-prefix-orthogonal frequency-division multiplexing (CP-OFDM), Discrete Fourier Transformation-Spread OFDM (DFT-S-OFDM), or another type of waveform), different modulation schemes (e.g., 256 Quadrature Amplitude Modulation (QAM), 64 QAM, 16 QAM, Quadrature Phase Shift Keying (QPSK), Binary Phase Shift Keying (BPSK), or another type of modulation scheme), aggregation and/or repetition techniques (e.g., Physical Downlink Shared Channel (PDSCH), Physical Uplink Shared Channel (PUSCH), Physical Uplink Control Channel (PUCCH) slot aggregation, PDCCH aggregation levels. Additionally, for example, the intelligent control may relate to scheduler decisions, such as Time Division Duplex (TDD) downlink:uplink ratio, slot structure, normal and mini-slot (e.g., 7/4/2 OFDM symbols, etc.), fast processing, multiple PDCCH monitoring occasions within a slot, preemptive scheduling, intra/inter-UE QoS prioritization, instant uplink access (e.g., configured grant Type 1, Type 2, etc.,) bandwidth parts (BWPs), sub-carrier spacing (SCS), Full Dimension-Multiple Input Multiple Output (FD-MIMO), number of transmit and receive ports, and/or multi-transmission and reception points (TRPs) joint scheduling. Also, the intelligent control may relate to beam management, number of transmitters and receivers, power boost, power control, link layer configurations, such as number of Hybrid Automatic Repeat Request (HARD) retransmissions, RLC mode (e.g., acknowledged mode (AM), unacknowledged mode (UM), transparent mode (TM)), RLC parameters (e.g., policies relating to retransmit timer, reassembly timer, etc.), PDCP parameters (e.g., re-ordering timer, discard timer, etc.), PDCP duplication, admission control, overload control, and/or call processing decisions (e.g., always-on Radio Resource Control (RRC), RRC inactive state, make-before-break handover, etc.).

As further illustrated in FIG. 2A, according to an exemplary embodiment, an A1 open interface may provide communication to and/or from non-real-time RIC 202. For example, the A1 interface may communicate information relating to policies, optimization, and other types of control information. Additionally, according to an exemplary embodiment, an E2 open interface may provide communication to and/or from near real-time RIC 204. For example, the E2 interface may communicate information relating to data collection and various near real-time control actions. Service management and orchestration device 218 may include a platform that enables the design, creation, and orchestration of services on an infrastructure layer in relation to virtual network functions, physical devices, and/or SDN, such as an Open Network Automation Platform (ONAP) or Open Source MANO (OSM).

Figure 2B:
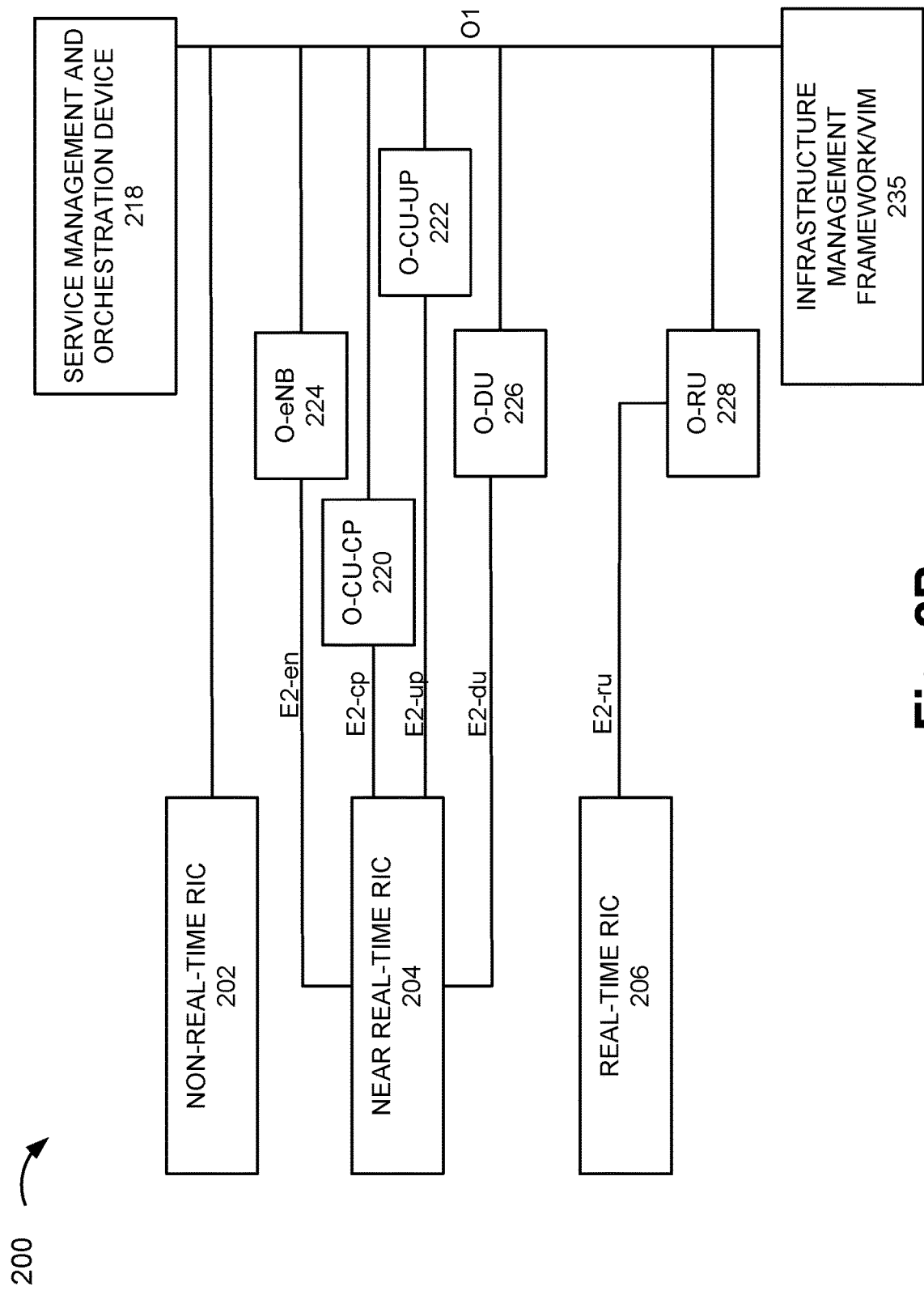
FIG. 2B is a diagram illustrating another exemplary environment in which an exemplary embodiment of the RIC system may be implemented.

According to an exemplary embodiment, the RIC service of RIC system 125 may incorporate the use of standard interfaces. For example, FIG. 2B is a diagram illustrating another exemplary environment 200 in which an exemplary embodiment of RIC system 125 may be implemented. As illustrated, access devices 107 may include an Open-CU-Control Plane device (O-CU-CP) 220, an O-CU-User Plane device (O-CU-UP) 222, an O-eNB device 224, an O-DU device 226, and an O-RU device 228 in which E2 interfaces may be used for communication to RIC system 125. An O1 open interface may be used to support communications between service management and orchestration device 218, access devices (e.g., O-CU-CP 220, etc.), and RICs 202, 204, and 206. For example, O1 interface may support communication of information relating to fault, configuration, performance, and software upgrade. Infrastructure management framework/Virtualized Infrastructure Manager (VIM) 235 may control and manage a Network Functions Virtualization Management and Orchestration (NFV-MANO) architecture, such as a VIM, a Virtual Network Function (VNF), and an NFV orchestrator. Infrastructure management framework/VIM 235 may be used to manage and control access devices 107, such as O-CUs and O-DUs.

Figure 2C:
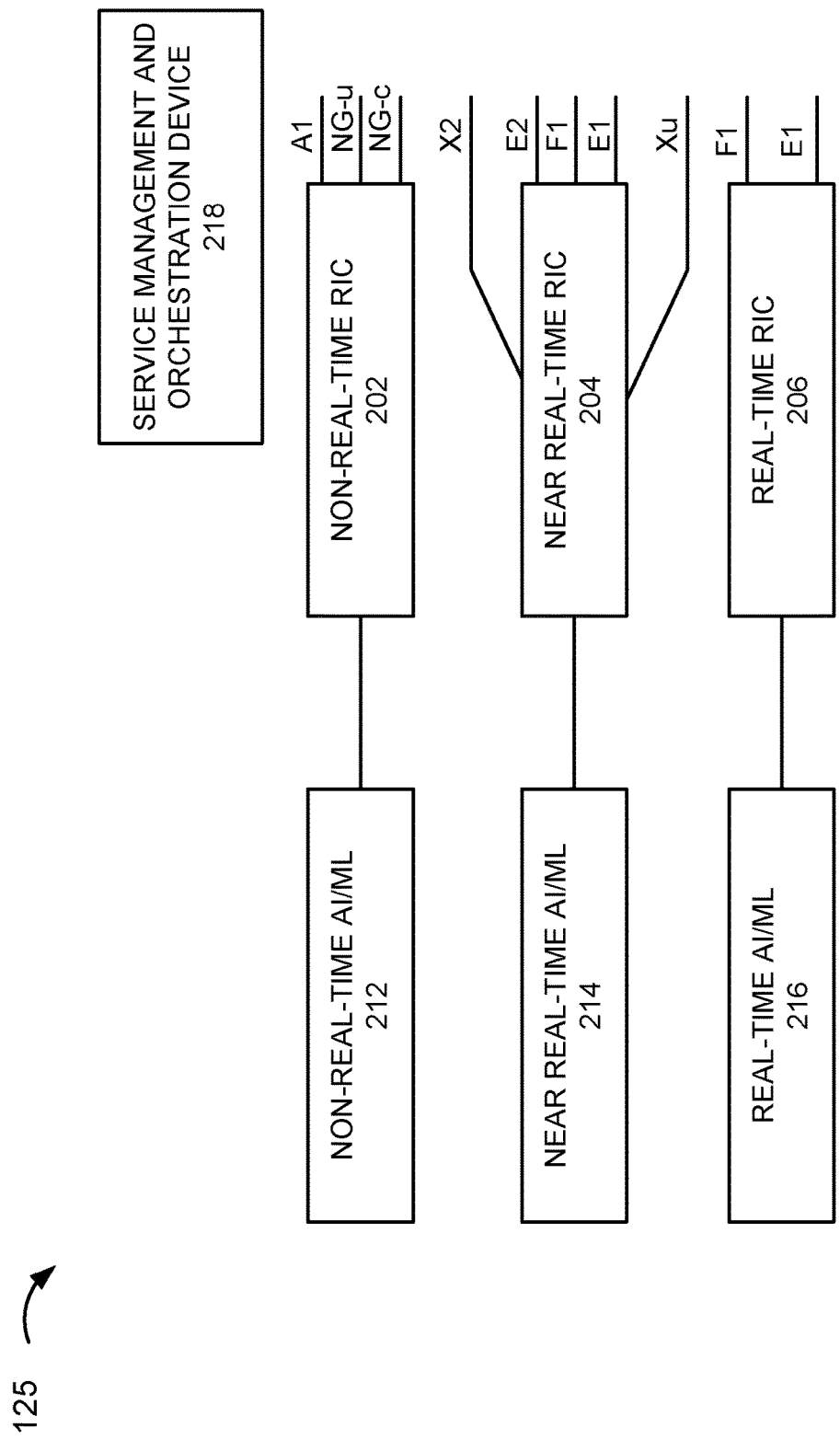
FIG. 2C is a diagram illustrating another exemplary embodiment of the RIC system.

According to another exemplary embodiment, the RIC service of RIC system 125 may include other types of interfaces. For example, referring to FIG. 2C, non-real-time RIC 202 may include an A1 interface, a next generation user plane interface (NG-u), and a next generation control plane interface (NG-c). Near real-time RIC 204 may include an E2 interface, an F1 interface, an E1 interface, an X2 interface, and/or an Xu interface. Also, for example, real-time RIC 206 may include an F1 interface and an E1 interface.

Figure 2D:
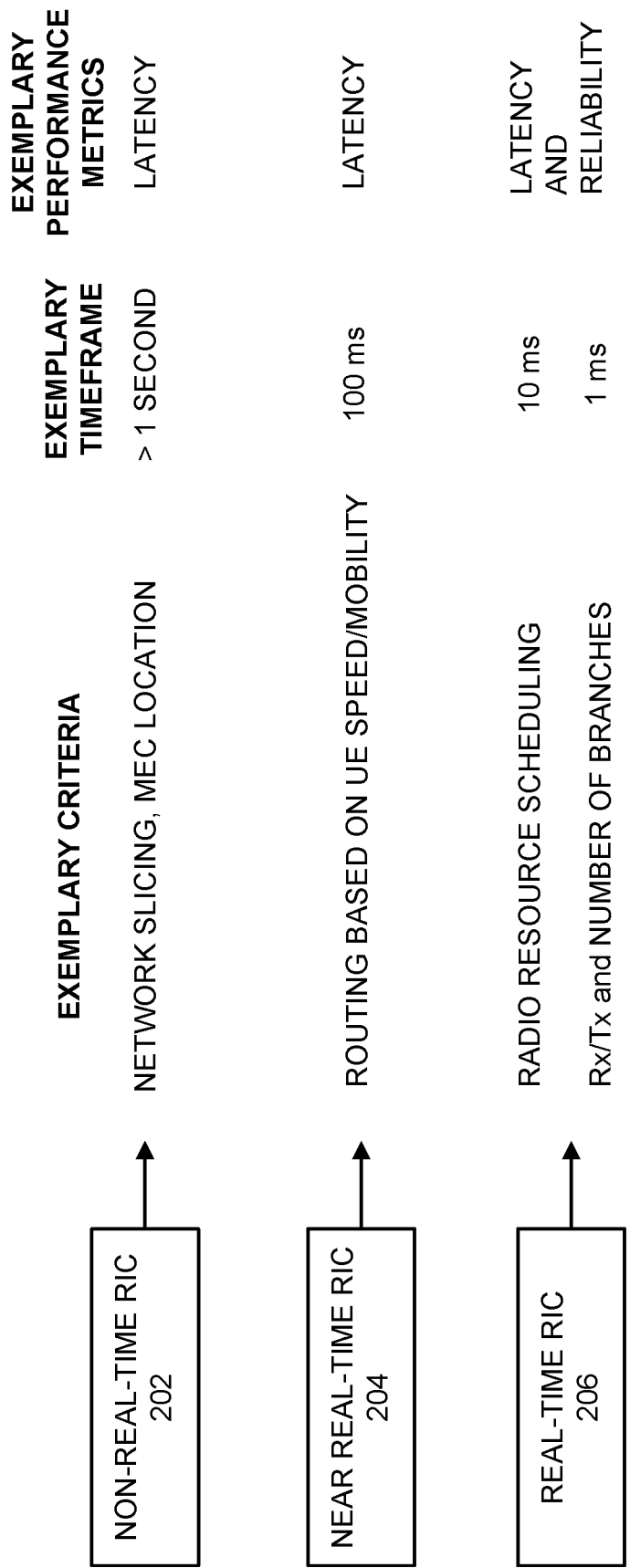
FIG. 2D is a diagram illustrating an exemplary configuration of the RIC system.

Typically, a higher reliability may be achieved with a relaxed latency requirement. Conversely, a lower latency requirement may be easier to achieve with a lower reliability requirement. As such, achieving both a low latency and a high reliability at the same time typically requires more network resources. However, the adaptation of RIC control to a desired latency and reliability for an application service may facilitate the optimization of RAN resources. For example, referring to FIG. 2D, non-real-time RIC 202, near-real-time RIC 204, and real-time RIC 206 may manage various criteria associated with a radio resource in view of a configurable timeframe, and performance metric. The criteria, timeframes, and performance metrics are merely exemplary, and the RIC service may be configured differently (e.g., in terms of criteria, timeframes, and performance metrics) from that illustrated in FIG. 2D. According to an exemplary embodiment, the non-real-time timeframe, the near real-time timeframe, and the real-time time frame are distinctive, as described herein. Additionally, for example, according to an exemplary embodiment, the non-real-time timeframe may be a longer time period than the near real-time timeframe and the real-time timeframe, and the near real-time time frame may be a longer time period than the real-time timeframe.

FIG. 3 is a diagram illustrating exemplary components of a device 300 that may be included in one or more of the devices described herein. For example, device 300 may correspond to access device 107, MEC device 117, core device 122, RIC system 125, end device 180, and/or other types of network devices, as described herein. As illustrated in FIG. 3, device 300 includes a bus 305, a processor 310, a memory/storage 315 that stores software 320, a communication interface 325, an input 330, and an output 335. According to other embodiments, device 300 may include fewer components, additional components, different components, and/or a different arrangement of components than those illustrated in FIG. 3 and described herein.

Bus 305 includes a path that permits communication among the components of device 300. For example, bus 305 may include a system bus, an address bus, a data bus, and/or a control bus. Bus 305 may also include bus drivers, bus arbiters, bus interfaces, clocks, and so forth.

Processor 310 includes one or multiple processors, microprocessors, data processors, co-processors, graphics processing units (GPUs), application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, neural processing unit (NPUs), and/or some other type of component that interprets and/or executes instructions and/or data. Processor 310 may be implemented as hardware (e.g., a microprocessor, etc.), a combination of hardware and software (e.g., a SoC, an ASIC, etc.), may include one or multiple memories (e.g., cache, etc.), etc.

Processor 310 may control the overall operation or a portion of operation(s) performed by device 300. Processor 310 may perform one or multiple operations based on an operating system and/or various applications or computer programs (e.g., software 320). Processor 310 may access instructions from memory/storage 315, from other components of device 300, and/or from a source external to device 300 (e.g., a network, another device, etc.). Processor 310 may perform an operation and/or a process based on various techniques including, for example, multithreading, parallel processing, pipelining, interleaving, etc.

Memory/storage 315 includes one or multiple memories and/or one or multiple other types of storage mediums. For example, memory/storage 315 may include one or multiple types of memories, such as, a random access memory (RAM), a dynamic random access memory (DRAM), a static random access memory (SRAM), a cache, a read only memory (ROM), a programmable read only memory (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 315 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 315 may include drives for reading from and writing to the storage medium.

Memory/storage 315 may be external to and/or removable from device 300, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 315 may store data, software, and/or instructions related to the operation of device 300.

Software 320 includes an application or a program that provides a function and/or a process. As an example, with reference to RIC system 125 software 320 may include an application that, when executed by processor 310, provides a function of the RIC service, as described herein. Software 320 may also include firmware, middleware, microcode, hardware description language (HDL), and/or other form of instruction. Software 320 may also be virtualized. Software 320 may further include an operating system (OS) (e.g., Windows, Linux, Android, proprietary, etc.).

Communication interface 325 permits device 300 to communicate with other devices, networks, systems, and/or the like. Communication interface 325 includes one or multiple wireless interfaces and/or wired interfaces. For example, communication interface 325 may include one or multiple transmitters and receivers, or transceivers. Communication interface 325 may operate according to a protocol stack and a communication standard. Communication interface 325 may include an antenna. Communication interface 325 may include various processing logic or circuitry (e.g., multi-plexing/de-multiplexing, filtering, amplifying, converting, error correction, application programming interface (API), etc.). Communication interface 325 may be implemented as a point-to-point interface, a service based interface, or a reference interface, for example.

Input 330 permits an input into device 300. For example, input 330 may include a keyboard, a mouse, a display, a touchscreen, a touchless screen, a button, a switch, an input port, speech recognition logic, and/or some other type of visual, auditory, tactile, etc., input component. Output 335 permits an output from device 300. For example, output 335 may include a speaker, a display, a touchscreen, a touchless screen, a light, an output port, and/or some other type of visual, auditory, tactile, etc., output component.

As previously described, a network device may be implemented according to various computing architectures (e.g., in a cloud, etc.) and according to various network architectures (e.g., a virtualized function, etc.). Device 300 may be implemented in the same manner. For example, device 300 may be instantiated, created, deleted, or some other operational state during its life-cycle (e.g., refreshed, paused, suspended, rebooting, or another type of state or status), using well-known virtualization technologies (e.g., hypervisor, container engine, virtual container, virtual machine, etc.) in an application service layer network (e.g., MEC network 115) and/or another type of network (e.g., access network 105, etc.).

Device 300 may perform a process and/or a function, as described herein, in response to processor 310 executing software 320 stored by memory/storage 315. By way of example, instructions may be read into memory/storage 315 from another memory/storage 315 (not shown) or read from another device (not shown) via communication interface 325. The instructions stored by memory/storage 315 cause processor 310 to perform a process described herein. Alternatively, for example, according to other implementations, device 300 performs a process described herein based on the execution of hardware (processor 310, etc.).

Figure 4:
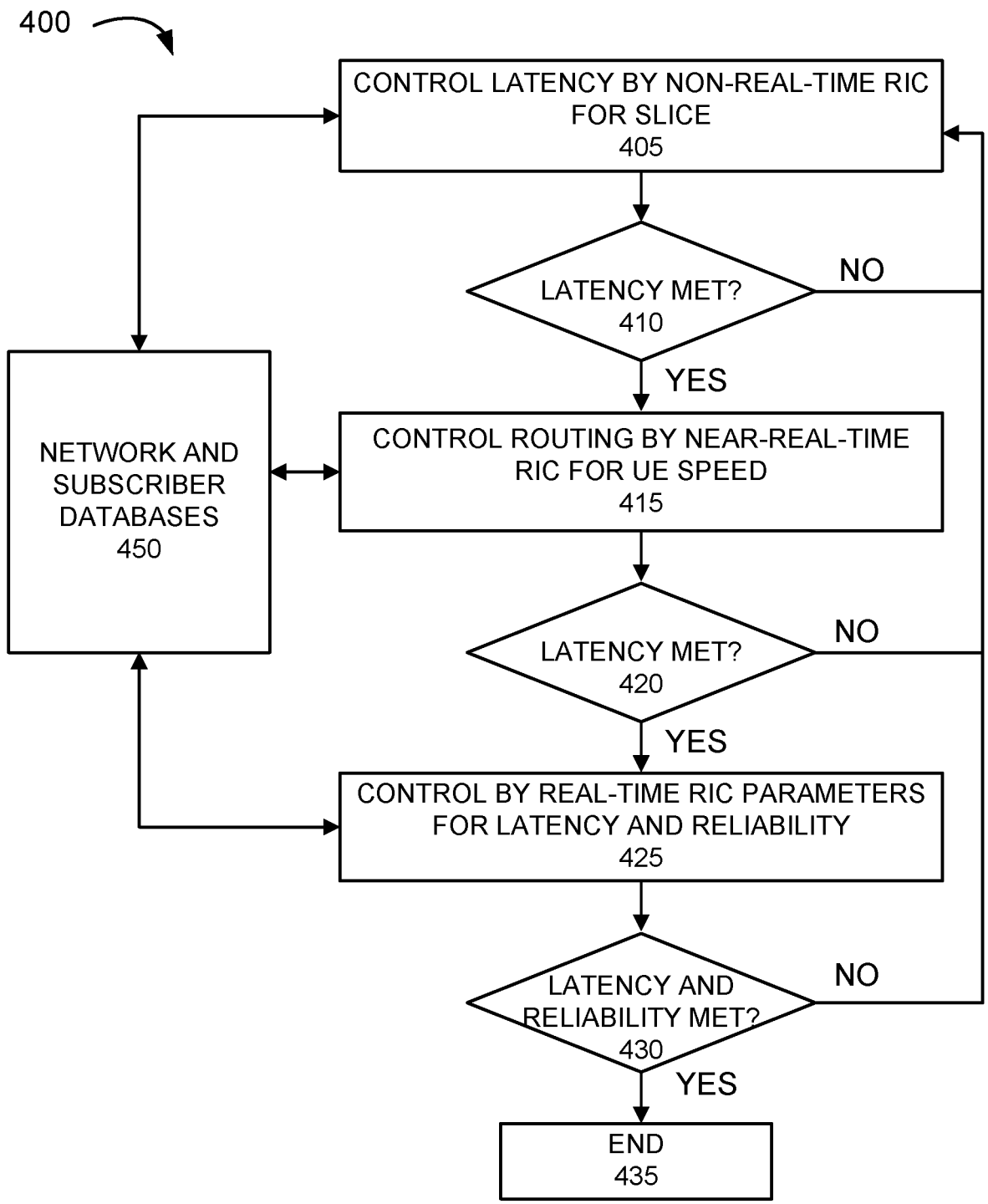
FIG. 4 is a flow diagram illustrating an exemplary process of an exemplary embodiment of the RIC service.

FIG. 4 is a flow diagram illustrating an exemplary process 400 of an exemplary embodiment of the RIC service. According to an exemplary embodiment, RIC system 125 may perform the steps of process 400. According to an exemplary implementation, processor 310 executes software 320 to perform a step of process 400, as described herein. Alternatively, a step may be performed by execution of only hardware. The performance of a step of process 400 may include a RIC and its corresponding AI/ML device. Process 400 may be performed iteratively in relation to the creation, maintenance, and termination of an application service session associated with end device 180. The performance metrics described in relation to process 400 are exemplary.

In block 405, non-real-time RIC 202 may receive a request to establish an application service session that may have a target latency requirement. Non-real-time RIC 202 (and non-real-time AI/ML 212) may identify whether a network slice and MEC server of MEC network 115 may satisfy the request pertaining to end device 180. For example, network slice information pertaining to available network slices, the location of end device 180, the availability of MEC servers, and other factors may be evaluated.

In block 410, non-real-time RIC 202 may determine whether the latency requirement may be satisfied or not based on the evaluation. When it is determined that the latency requirement may not be satisfied for a prescribed time frame (e.g., a non-real-time time scale) (block 410-NO), process 400 may return to block 405. For example, non-real-time RIC 202 may change a control parameter in relation to the radio resources/network slice (e.g., select another network slice, select another MEC server, select another MEC network, etc.), change another aspect of the application service (e.g., instead of providing both audio and video, just provide video or audio, change a latency requirement, etc.), and other factors as described herein may be changed.

When it is determined that the latency requirement may be satisfied for the prescribed time frame (block 410-YES), near-real-time RIC 204 may identify radio and transport routing for end device 180 in view of the application service session, the network slice, and the latency requirement (block 415). Near real-time RIC 204 (and near real-time AI/ML 214) may identify whether a route and associated access devices 107 may satisfy the request pertaining to end device 180. For example, the resources associated with various CUs and DUs, the cell at which end device 180 is situated, the mobility of end device 180 (e.g., stationary, mobile, speed, direction, etc.), and other factors as described herein may be evaluated.

In block 420, near real-time RIC 204 may determine whether the latency requirement may be satisfied or not based on the evaluation. When it is determined that the latency requirement may not be satisfied for a prescribed time frame (e.g., a near real-time scale) (block 420-NO), process 400 may return to block 405.

However, when it is determined that the latency requirement may be satisfied for the prescribed time frame (block 420-YES), real-time RIC 206 may identify radio scheduling of access devices 107 and radio signal characteristics in view of the routing, the network slice, the application service session, the latency requirement and a reliability requirement (block 425). Real-time RIC 206 (and real-time AI/ML 216) may identify DUs (and/or RUs) that may satisfy the request pertaining to end device 180. For example, link characteristics, scheduling, beam management, transmit and receive powers, a parameter pertaining to a protocol layer (e.g., RLC, PDCP, etc.), and other factors as described herein may be evaluated.

In block 430, real-time RIC 206 may determine whether the latency requirement and the reliability may be satisfied or not based on the evaluation. When it is determined that the latency requirement and the reliability requirement may not be satisfied for a prescribed time frame (e.g., a real-time time scale) (block 430-NO), process 400 may return to block 405. When it is determined that the latency requirement and the reliability requirement may be satisfied for the prescribed time scale (block 430-YES), process 400 may end. For example, the radio resources may be provisioned and used for the creation of the application service session on behalf of end device 180. Process 400 may be iteratively performed thereafter. For example, process 400 may adjust, relax, or downgrade one or more performance metrics for a next iteration based on various information (e.g., user subscriber profile, required services, etc.). By way of further example, a target value for latency may be adjusted in the next iteration (e.g., 100 ms may be changed to 150 ms or some other relaxed value) when the current target value cannot be met.

Figure 5:
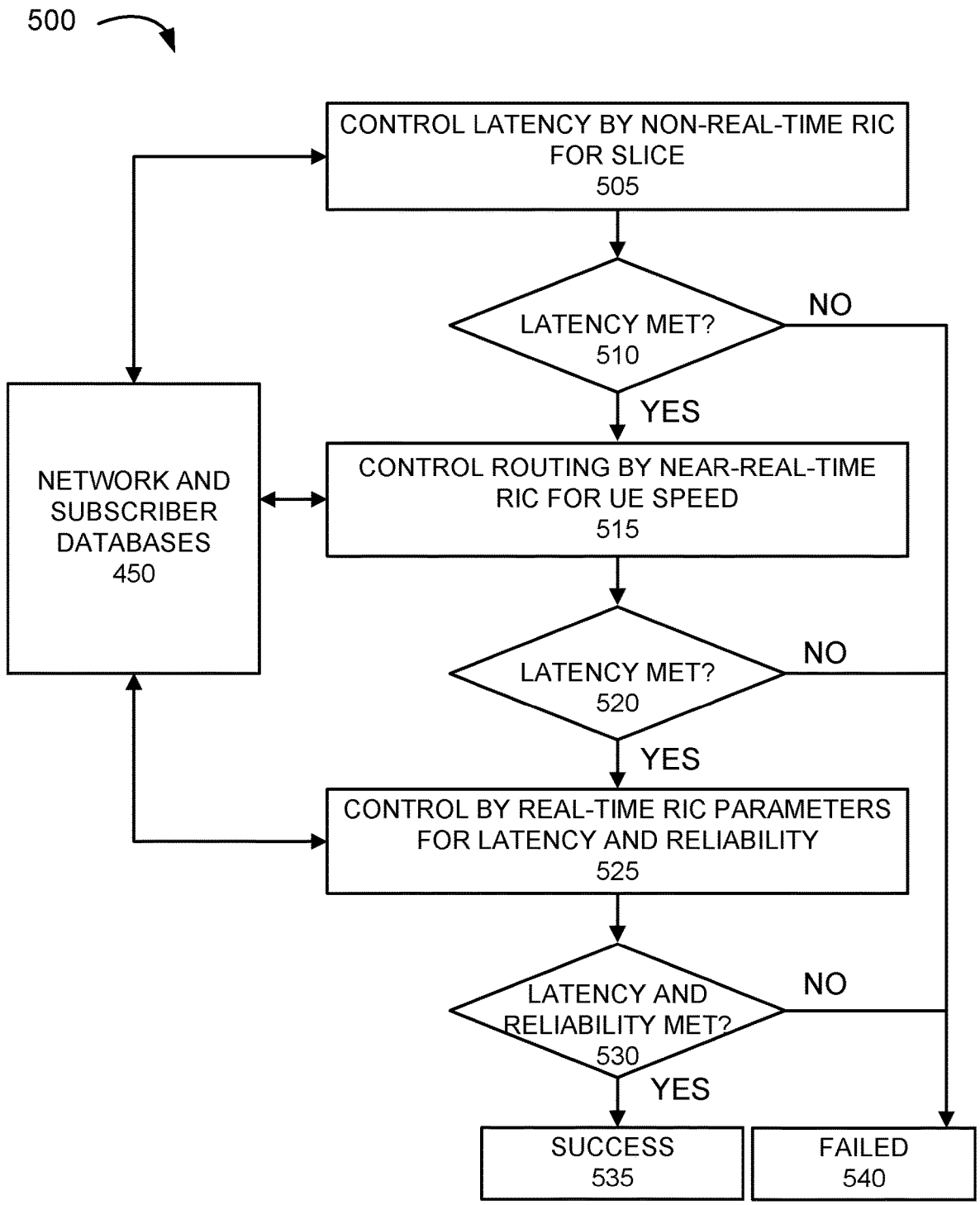
FIG. 5 is a flow diagram illustrating another exemplary process of an exemplary embodiment of the RIC service.

FIG. 5 is a flow diagram illustrating another exemplary process 500 of an exemplary embodiment of the RIC service. According to an exemplary embodiment, RIC system 125 may perform the steps of process 500. According to an exemplary implementation, processor 310 executes software 320 to perform a step of process 500, as described herein. Alternatively, a step may be performed by execution of only hardware. The performance of a step of process 500 may include a RIC and its corresponding AI/ML device. Process 500 may be performed iteratively in relation to the creation, maintenance, and termination of an application service session associated with end device 180. The performance metrics described in relation to process 500 are exemplary.

As illustrated in FIG. 5, process 500 may include steps similar to process 400, which will not be repeated for the sake of brevity, except in blocks 510, 520, and 530 such that when latency or latency and reliability are not met, process 500 may fail (block 540). For example, end device 180 may denied an application service because the performance metrics (e.g., latency or latency and reliability) cannot be satisfied based on user profile and the application service required. Otherwise, when latency or latency and reliability are met, process may succeed (block 535).

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of blocks have been described with regard to the processes illustrated in FIGS. 4 and 5, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 310, etc.), or a combination of hardware and software (e.g., software 320).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 310) of a device. A non-transitory storage medium includes one or more of the storage mediums described in relation to memory/storage 315. The non-transitory computer-readable storage medium may be implemented in a centralized, distributed, or logical division that may include a single physical memory device or multiple physical memory devices spread across one or multiple network devices.

To the extent the aforementioned embodiments collect, store or employ personal information of individuals, it should be understood that such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known are expressly incorporated herein by reference and are intended to be encompassed by the claims.

What is claimed is:

1. A method comprising:
   receiving, by a first radio access network intelligent controller (RIC) of a RIC system, a request for radio resources pertaining to an end device and an application service;
   determining, by the first RIC, whether a first performance metric of the application service can be satisfied by a first radio resource of a radio access network for a non-real-time timeframe based on the request;
   determining, by a second RIC of the RIC system, whether the first performance metric of the application service can be satisfied by a second radio resource of the radio access network for a near-real-time timeframe when the first performance metric can be satisfied by the first radio resource; and
   determining, by a third RIC of the RIC system, whether a first performance metric and a second performance metric of the application service can be satisfied for a real-time timeframe by a third radio resource of the radio access network when the first performance metric can be satisfied by the second radio resource.

2. The method of claim 1, wherein the first radio resource includes a network slice, and the second radio resource includes a centralized unit and a distributed unit of the radio access network that routes traffic of the application service.

3. The method of claim 1, wherein the first performance metric is latency and the second performance metric is reliability.

4. The method of claim 1, further comprising:
   provisioning the first radio resource, the second radio resource, and the third radio resource for the application service and the end device.

5. The method of claim 1, wherein determining whether the performance metric of the application service can be satisfied by the second radio resource of the radio access network for the near-real-time time frame is based one or more mobility parameters pertaining to the end device of the RIC system.

6. The method of claim 1, further comprising:
   selecting, by the first RIC, the first radio resource based on non-real-time radio information of a non-real-time machine learning or artificial intelligence device of the RIC system.

7. The method of claim 1, further comprising:
   selecting, by the second RIC, the second radio resource based on near real-time radio information of a near real-time machine learning or artificial intelligence device of the RIC system.

8. The method of claim 1, further comprising:
   selecting, by the third RIC, the third radio resource based on real-time radio information of a real-time machine learning or artificial intelligence device, wherein the third radio resource includes radio scheduling and radio signal characteristics.

9. The method of claim 1, further comprising:
   determining, by the first RIC of the RIC system, whether the first performance metric of the application service can be satisfied by another first radio resource of the radio access network for the non-real-time timeframe when determining that the first performance metric and the second performance metric of the application service cannot be satisfied for the real-time timeframe by the third radio resource of the radio access network.

10. The method of claim 1, further comprising:
    adjusting at least one of a first value of the first performance metric or a second value of the second performance metric based on determining that at least one of the first performance metric or the second performance metric cannot be satisfied.

11. A system comprising:
    a first radio access network intelligent controller (RIC) that includes a first processor;
    a second RIC that includes a second processor;
    a third RIC that includes a third processor;
    wherein the first processor is configured to:
       receive a request for radio resources pertaining to an end device and an application service;
       determine whether a first performance metric of the application service can be satisfied by a first radio resource of a radio access network for a non-real-time timeframe;
    wherein the second processor is configured to:
       determine whether the first performance metric of the application service can be satisfied by a second radio resource of the radio access network for a near real-time timeframe when the first performance metric can be satisfied by the first radio resource; and wherein the third processor is configured to:
  determine whether a first performance metric and a second performance metric of the application service can be satisfied for a real-time timeframe by a third radio resource of the radio access network when the first performance metric can be satisfied by the second radio resource.

12. The system of claim 11, wherein the first radio resource includes a network slice, and the second radio resource includes a centralized unit and a distributed unit of the radio access network that routes traffic of the application service.

13. The system of claim 11, wherein the first performance metric is latency and the second performance metric is reliability.

14. The system of claim 11, wherein the first, second, and third processors are further configured to:
  provision the first radio resource, the second radio resource, and the third radio resource for the application service and the end device.

15. The system of claim 11, wherein the first processor is further configured to:
  select the first radio resource based on non-real-time radio information of a non-real-time machine learning or artificial intelligence device of the system.

16. The system of claim 11, wherein the second processor is further configured to:
  select the second radio resource based on near real-time radio information of a near real-time machine learning or artificial intelligence device of the system.

17. The system of claim 11, wherein the third processor is further configured to:
  select the third radio resource based on real-time radio information of a real-time machine learning or artificial intelligence device, wherein the third radio resource includes radio scheduling and radio signal characteristics.

18. The system of claim 11, wherein the first processor is further configured to:
  determine whether the first performance metric of the application service can be satisfied by another first radio resource of the radio access network for the non-real-time timeframe when it is determined that the first performance metric and the second performance metric of the application service cannot be satisfied for the real-time timeframe by the third radio resource of the radio access network.

19. The system of claim 11, wherein at least one of the first processor, the second processor, or the third processor is further configured to:
  adjust at least one of a first value of the first performance metric or a second value of the second performance metric based on a determination that at least one of the first performance metric or the second performance metric cannot be satisfied.

20. A non-transitory computer-readable storage medium storing instructions executable by a processor of a radio access network intelligent controller (RIC) system, which when executed cause the RIC system to:
  receive a request for radio resources pertaining to an end device and an application service;
  determine whether a first performance metric of the application service can be satisfied by a first radio resource of a radio access network for a non-real-time timeframe;
  determine whether the first performance metric of the application service can be satisfied by a second radio resource of the radio access network for a near real-time timeframe when the first performance metric can be satisfied by the first radio resource; and
  determine whether a first performance metric and a second performance metric of the application service can be satisfied for a real-time timeframe by a third radio resource of the radio access network when the first performance metric can be satisfied by the second radio resource.

* * * * *